J. R. BOWLING.
TRACTOR.
APPLICATION FILED APR. 23, 1918.
1,297,291.
Patented Mar. 11, 1919.
4 SHEETS—SHEET 1.
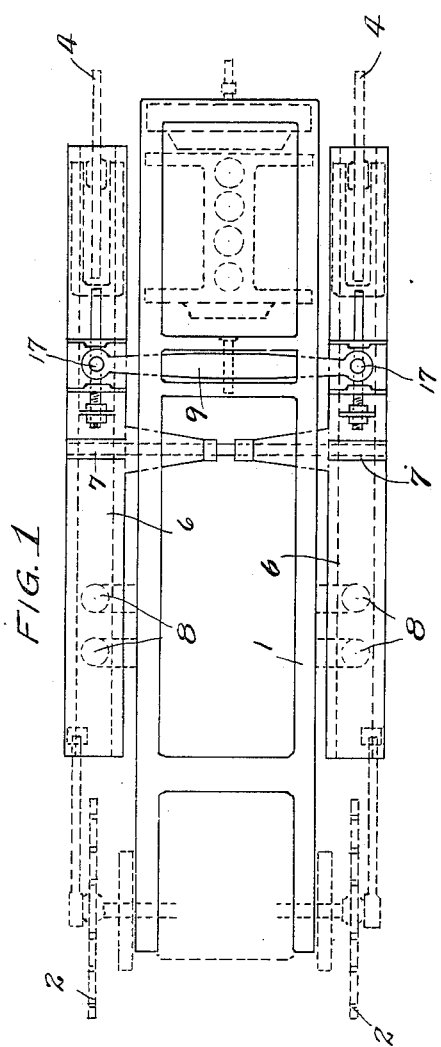
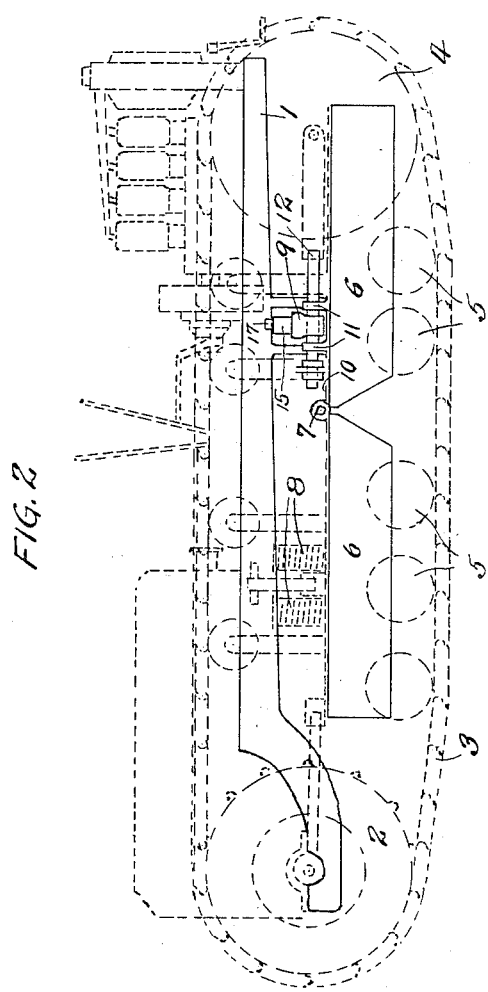
INVENTOR
Joseph R. Bowling
By _____ ATTORNEY J. R. BOWLING.
TRACTOR.
APPLICATION FILED APR. 23, 1918.
1,297,291.
Patented Mar. 11, 1919.
4 SHEETS—SHEET 2.
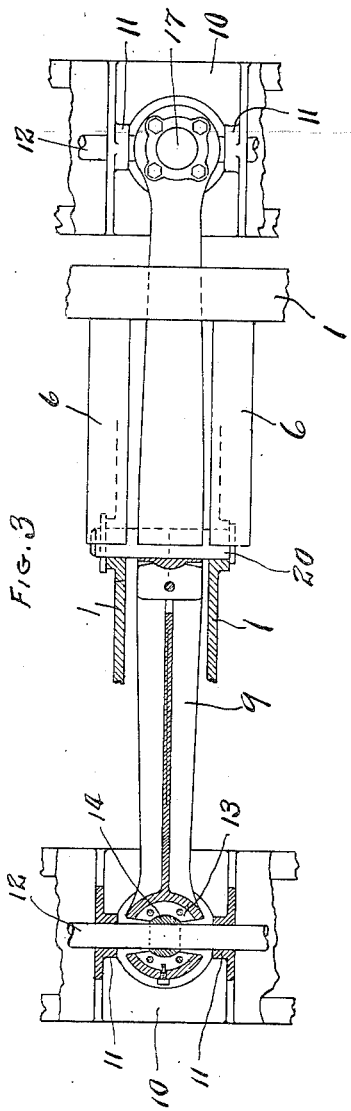
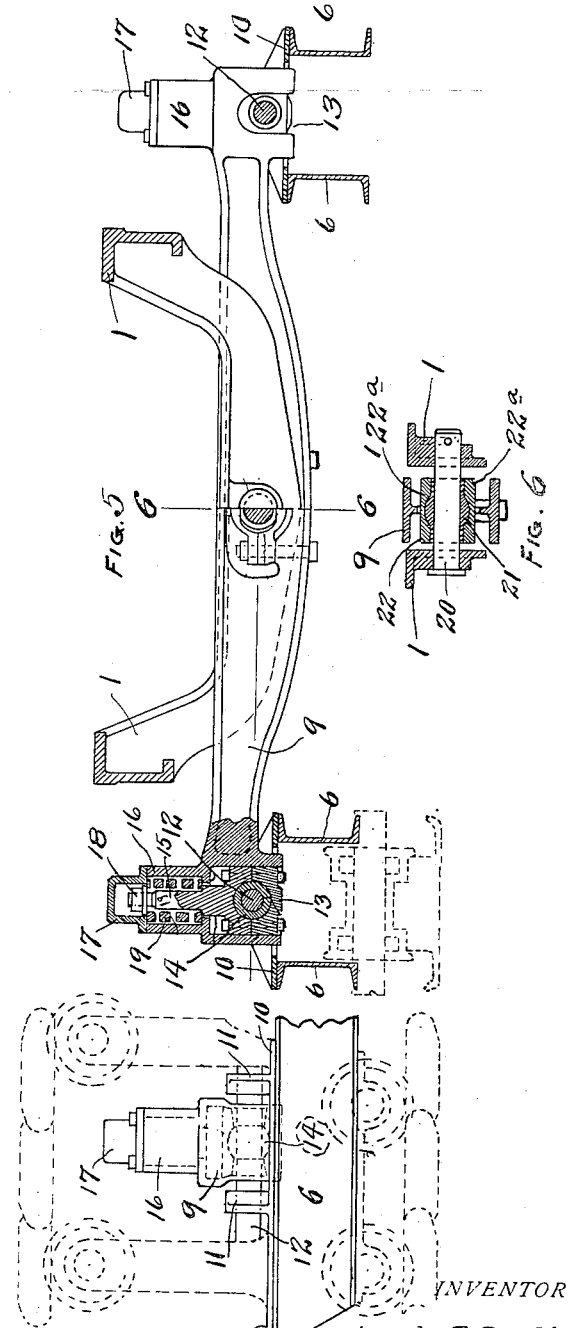
INVENTOR
Joseph R. Bowling
By ATTORNEY

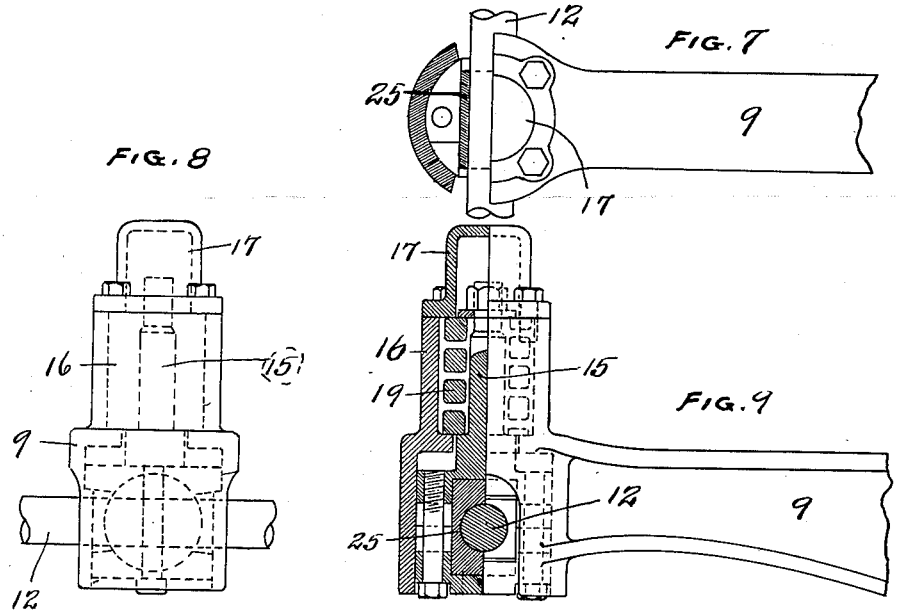
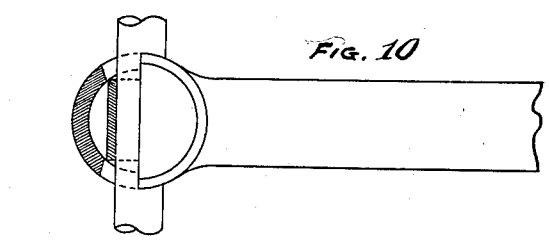
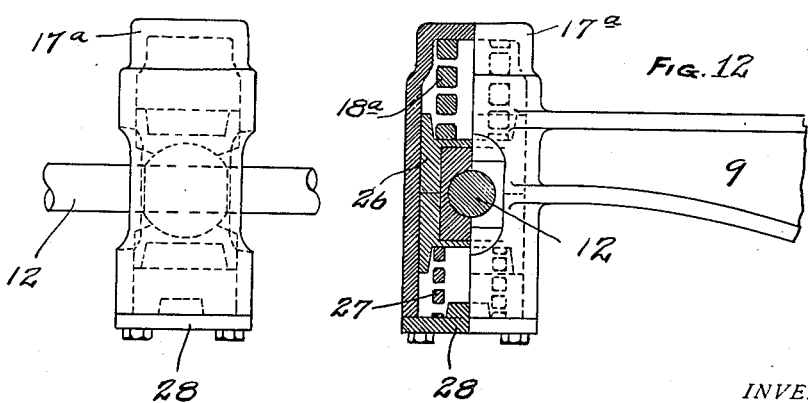

J. R. BOWLING.
TRACTOR.
APPLICATION FILED APR. 23, 1918.
1,297,291.
Patented Mar. 11, 1919.
4 SHEETS—SHEET 4.
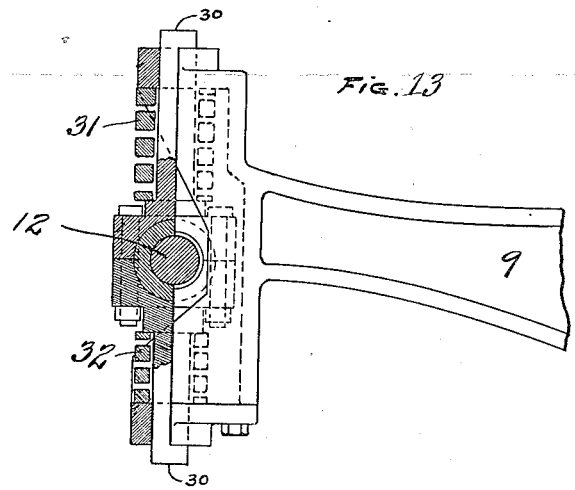
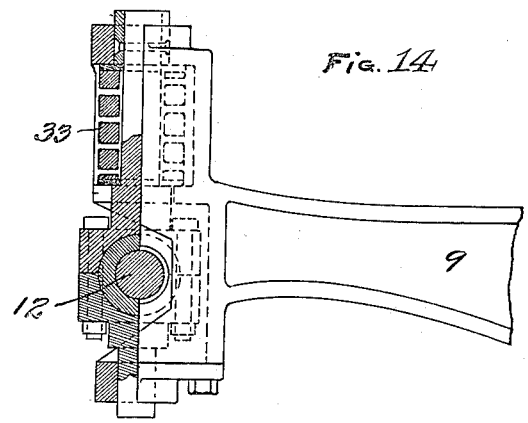
INVENTOR
Joseph R. Bowling
By ATTORNEY

UNITED STATES PATENT OFFICE.

JOSEPH R. BOWLING, OF ST. LOUIS, MISSOURI.

TRACTOR.

1,297,291.

Specification of Letters Patent.   Patented Mar. 11, 1919.

Application filed April 23, 1918.   Serial No. 230,227.

*To all whom it may concern:*

Be it known that I, JOSEPH R. BOWLING, a citizen of the United States, residing at St. Louis, Missouri, have invented a certain new and useful Improvement in Tractors, of which the following is a full, clear, and exact description, such as will enable others skilled in the art to which it appertains to make and use the same, reference being had to the accompanying drawings forming part of this specification.

Figure 1 is a plan view of a tractor.

Fig. 2 is a side elevational view of the same.

Fig. 3 is a plan view of the supporting transom partly in horizontal section.

Fig. 4 is an end elevational view of the transom connection.

Fig. 5 is an end elevational view of the transom partly in vertical section.

Fig. 6 is a sectional view through line 6—6 of Fig. 5.

Figs. 7, 8, and 9 are top plan end elevational and vertical sectional views of a modified form of transom connection.

Figs. 10, 11, and 12 are top plan end elevational and vertical sectional views through another modified form of transom connection.

Fig. 13 is a side elevational view partly in section of another modified form of my invention.

Fig. 14 is a similar view of another modified form.

This invention relates to a new and useful improvement in tractors and particularly to the manner of connecting the transom or equalizer bar to the side frames and also to the manner of supporting the main frame on the transom.

In tractors of the type shown in Figs. 1 and 2, the main frame 1 is in the form of a casting or a built-up structure which carries sprocket drivers 2 at its rear end over which pass the links of endless traction members 3. These links pass over the idle rollers and around forward idlers 4. Idlers 5 are carried by frames 6 hinged at 7, the rearmost section of the hinged frame 6 supporting the frame 1 by means of springs 8, while the foremost members of the frame 6 support a transom 9 to which is pivotally connected the main frame 1.

Referring now to Figs. 3 to 5, it will be observed that the frame 6 is made up of a top cover plate 10, said cover plate carrying bearings 11 in which is mounted a rod 12 one of whose functions may be to adjust the forward position of the idler 4. Between the bearings 11, the transom is supported and is free to move forwardly and backwardly on the rod a slight distance, while at the same time said transom has a universal movement relative to the rod so as to accommodate the play of either one of the forward side frame sections 6 when the tractor shoes pass over uneven ground.

In Figs. 3 to 5, it will be observed that the transom 9 is provided with downwardly opening pockets at its ends in which there is a journal bearing 13 mounted for vertical movement, the side walls of the pocket being cut away to permit a vertical play over the rod 12. Within this journal bearing is a spherical bearing 14 for embracing the rod 12 and the bearings 13 are so shaped as to give sufficient clearance and play of the parts as shown at the left in Fig. 3. In this way, a universal bearing of limited play is provided and in order to yieldingly support the end of the transom, I provide a stem 15 on the upper bearing member which stem extends through a housing 16 and into a cap 17, there being a bolt and a washer arrangement 18 at the upper end of the stem whereby a spring 19 is confined between the washer and a shoulder on the stem 13, within the housing. The load imposed upon the spring is through the cap piece 17 then onto the shoulder of the stem, and finally onto the rod 12. In the event of a sudden lifting of the weight, the recoil will be absorbed by compressing the spring through the shoulder on the stem and the cap piece 17.

The main frame 1, as shown in Fig. 6, straddles the transom and is pivotally connected thereto by means of a pin 20. This pin passes through a spherical bearing member 21 arranged within the two-part bearing 22, the latter having its upper and lower surfaces flattened as at 22ª whereby the main frame 1, while being universally supported by the transom has its play of movement limited.

In Figs. 7 to 9, I have shown a modified construction of yielding universal support for the transom in which there is a modified form of bearing box 25 embracing the rod 12.

In this form, as in Figs. 3 and 5, the weight on the spring is supported by a shoulder on the stem extending up from the bearing box, whereas in Figs. 10 to 12, the cap piece 17ª on the end of the transom is formed integral therewith and directly engages the spring 18ª which bears directly upon the bearing box 26, there being a recoil spring 27 located under the bearing and cooperating with a bottom plate 28 which closes the downwardly opening pocket in the end of the transom in which the bearing for the rod 12 is mounted for vertical movement.

In Fig. 13 I have shown a form in which the housing at the end of the transom does not completely embrace the bearing and its springs, the bearing being guided by the rod 30 passing through the top and bottom walls of the housing, said rod including in its length the bearing members and caps constituting the mount for the spherical bearing for the rod 12.

In Fig. 13, 31 indicates the main supporting spring and 32 the recoil spring.

In Fig. 14, 33 indicates the single spring which serves both as the supporting spring when the load is imposed in one direction and the recoil spring to absorb the shock when the load is imposed in an opposite direction.

It will be readily understood that minor changes in the size, form and construction of the various parts of my improved tractor may be made and substituted for those herein shown and described, without departing from the spirit of my invention, the scope of which is set forth in the appended claims.

I claim:

1. In a tractor, the combination of a rigid main frame, a hinged supporting frame therefor, the latter having bearings, longitudinally disposed rods in said bearings, a transom mounted on said rods and having universal movement relative thereto, and springs interposed between said rods and transom whereby said transom has a free sliding motion on said rods and is capable of a pivotal movement relative thereto.

2. In a tractor, the combination of a main supporting frame, hinged frames arranged thereunder and capable of independent movement, rods supported by the forward set of said hinged frames, a transom slidingly mounted on said rods and having universal movement relative thereto, and a hinged connection between said transom and said main frame, said hinged connection comprising a flattened sleeve ball attachment arranged within suitable bearings carried by one of the parts.

3. In a tractor, the combination of a main supporting frame, hinged frames arranged thereunder and capable of independent movement, rods supported by the forward set of said hinged frames, a transom having bearings at its ends for engaging said rods, said bearings being arranged for vertical movement in said housings, and springs cooperating with said bearings and housings.

4. In a tractor, the combination of a main supporting frame, hinged frames arranged thereunder and capable of independent movement, rods supported by the forward set of said hinged frames, a transom, bearings having vertical movement relative to said transom, said bearings being slidingly mounted on said rods, and springs cooperating with said bearings for supporting said transom and absorbing the recoil thereof.

In testimony whereof I hereunto affix my signature this 19th day of April, 1918.

JOSEPH R. BOWLING.